Figure 1:
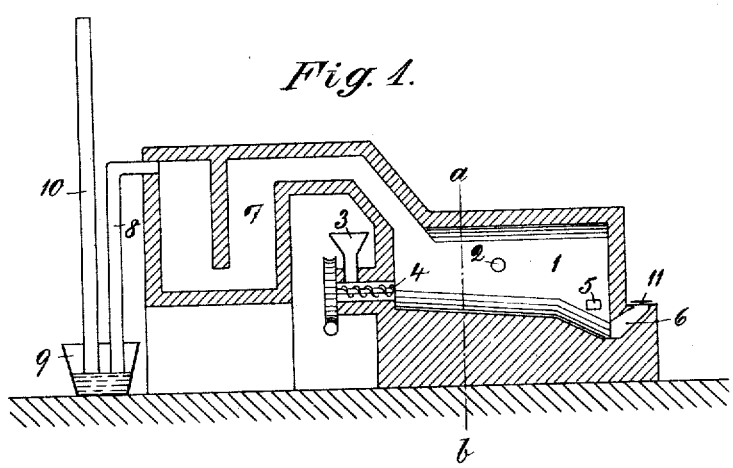

E. S. BERGLUND.
EXTRACTION OF LEAD.
APPLICATION FILED MAR. 11, 1918.

1,306,942.

Patented June 17, 1919.

INVENTOR
E. S. Berglund
BY L. R. Kerslake
ATTORNEY

UNITED STATES PATENT OFFICE.

EDWARD SALOMON BERGLUND, OF TROLLHÄTTAN, SWEDEN, ASSIGNOR TO SVEN HULDT, OF STOCKHOLM, SWEDEN.

EXTRACTION OF LEAD.

1,306,942.  Specification of Letters Patent.  Patented June 17, 1919.

Application filed March 11, 1918. Serial No. 221,862.

*To all whom it may concern:*

Be it known that I, EDWARD SALOMON BERGLUND, residing at Trollhättan, Sweden, have invented certain new and useful Improvements in the Extraction of Lead, of which the following is a specification.

For extracting lead in a reverberatory furnace, the so called roasting and reaction method or in some cases the precipitating method, in which the lead is extracted by smelting the unroasted ore together with metallic iron, hitherto has been employed.

In a common reverberatory furnace, heated by means of coal firing, and in which the roasting and reaction method is performed, it is possible to make the flame, heating the furnace and the charge, reducing, indifferent or oxidizing, as may be desired, even although the atmosphere has a free admission to the furnace chamber. The furnace gases in this case prevent the lead, being extracted during the reaction, from being oxidized, so that the result of the smelting operation will be reduced lead.

However the roasting and reaction method in a common reverberatory furnace is only employable for ores rich in lead, in view of the fact that the method owing to the considerable consumption of fuel would be uneconomical to use with lean ores. Moreover only such ores are employable, which contain less than five per cent. silicic acid, as the silicic acid together with lead oxid forms lead silicate, and prevents the desired reaction for the reduction of lead.

Further in the usual method of extracting lead the temperature must be maintained within certain limits in the furnace, so that the charge does not smelt, as in such case the reaction is rendered more difficult, and moreover heavy losses of lead, owing to the volatilizing of lead occur at high temperatures. In said method therefore only 60 per cent. of the amount of lead contained in the charge can be extracted. For extracting the remaining amount of lead oxid contained in the smelted residue, said residue must be subjected to a re-smelting operation in a shaft furnace.

Even in extracting lead according to the precipitating method by means of metallic iron the necessary high temperature results in heavy losses of lead.

The result is the same when employing roasted lead ore or residues containing lead, according to the roasting and reaction method, the reduction with carbon necessitating so high temperatures, that the losses of lead owing to the volatilization of lead are considerable.

Moreover said losses of lead involve a great danger for poisoning of the employees.

The methods for extracting lead hitherto used have thus been limited to certain, suitable ores, and it has not been possible to extract all of the lead contained in said ores, by the said methods.

The present invention has for its object to avoid the inconveniences, connected with the methods hitherto employed for extracting lead, and to utilize any material containing lead, and thereby to extract, practically speaking all of the lead contained in the charge. The invention consists in treating the material, containing lead, which of course is mixed with substances necessary for the reactions required, by means of electric heat at a temperature which is so high that the charge is completely smelted, whereby the access of the atmosphere to the smelting chamber is prevented, and the vapors, arising at the smelting operation, are condensed.

By employing such high temperatures, in performing the method that the charge is completedly smelted, practically speaking all of the lead contained in the charge, is extracted in one single smelting operation, and by the combination of the smelting operation with a condensation of the escaping vapors, containing lead, no substantial losses of lead result. Thus it is possible to choose that method of treating the ore, which is most suitable for the charge in question.

For treating roasted ore or oxidized products containing lead, the charge is mixed with the amount of carbon necessary for the reduction, and also, if necessary, with a suitable amount of slag producing substances.

A mixture of unroasted and roasted ore may be smelted according to the reaction method, also unroasted ore, mixed with products, containing lead oxid, whereby even in these cases producing substances may be added, if necessary.

Unroasted ore may be smelted alone mixed with metallic iron or with iron ore and carbon.

It has been shown that if the known roasting and reaction method be carried out in an electric furnace, constructed in accordance with the common reverberatory furnaces employed for extracting lead, only a small amount of metallic lead is obtained. In such an electric furnace the reduced lead is not protected by a sufficient amount of gases, as in the common reverberatory furnace, and therefore the lead will be oxidized to lead oxid at the time of its formation. The result therefore will be a mere roasting of the ore, after which the ore will slag or smelt to a more or less rich mass, containing lead oxid.

Figure 2:
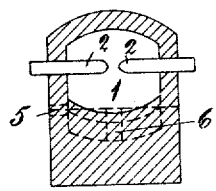

The drawing shows an embodiment of a construction for carrying out the present invention. Figure 1 is a longitudinal section and Fig. 2 a transverse section on the line a—b in Fig. 1 of a smelting furnace according to the present invention.

1 indicates the electric smelting chamber, 2, 2, the electrodes between which there is produced an electric light arc, 3 a feed hopper and 4 a feed screw for continuously introducing the material, containing lead. 5 indicates a tapping opening for slag, and 6 a channel, arranged as a fluid seal, from which the reduced lead is drawn off. 7 indicates a condensing device for the condensation of vapors, and 8 indicates the exhaust conduit for the non-condensed vapors and gases escaping from the condenser 7, said conduit extending down into a liquid seal 9, from which an escape pipe 10 leads to the atmosphere or to any other place, where the escaping vapors and gases may be consumed if desired.

The arrangement is such, that the smelting chamber is shut off from the atmosphere at the place 4 of introduction as well as at the place 6 for drawing off the lead, and at the point of escape 8, 9, 10 of the non-condensed vapors. At the start of the process the drawing off place 6 is filled with smelted lead and the escapes 8, 9, 10 with fluid. The introduction of material containing lead is preferably thereafter performed continuously, whereby the material is introduced on the bottom of furnace chamber 1, where the reactions take place and the material is fused simultaneously with the extraction of metallic lead. As the access of air is shut off from the furnace chamber as mentioned, no oxidation of the extracted lead takes place, but said lead runs down the inclined furnace bottom to the channel 6, where the lead serves as a liquid seal, from which the lead may be drawn off through the opening 11. The temperature in the furnace chamber is maintained so high, that the charge completely smelts. The amount of lead, which thereby possibly vaporizes, will not be lost, as in hitherto used methods, but is condensed in the condenser 7. By this means vapors and gases produced in the smelting chamber, may be drawn off without difficulty in such a manner, that the non-condensed gases and vapors, escaping through the conduit 10, are practically free from lead. By means of the liquid seal 9 the gas flow from the smelting chamber 1 may be regulated as desired.

Having now particularly described my invention, and in what manner the same is to be performed, I claim as my invention:

1. The method of extracting lead, consisting in smelting a charge, containing lead, by means of electric heat, excluding access of air, drawing off in liquid form, separately, the slag and a part of the molten lead from the furnace chamber, and condensing the lead vapors carried by the escaping vapors and gases.

2. The method of extracting lead, consisting in continuously introducing a charge, containing lead, in an electric hermetically closed furnace chamber, smelting said charge by means of electric heat, drawing off the liquid extracted lead, excluding access of air, and condensing the escaping vapors containing lead.

3. The method of extracting lead, consisting in smelting a charge, containing lead, by means of an electric arc, excluding air from the furnace chamber, drawing off one part of the lead in liquid form through a liquid seal, and condensing the lead vapors from the gaseous products of the reaction.

4. A method of extracting lead, consisting in treating the charge containing lead by means of electric heat at such a high temperature that the charge and slag-forming material suitable for the process are completely smelted, excluding access of air from the furnace, collecting the liquid extracted lead in the furnace chamber, and condensing the escaping lead vapors.

5. A method of extracting lead, consisting in continuously introducing a charge containing lead into a furnace chamber, exposing said charge to such high temperature by means of electric heat, that the charge and the slag material contained therein are completely smelted, gathering the liquid extracted lead in the furnace chamber so that it constitutes a seal, conducting the escaping lead vapors away from the chamber, condensing such vapors, and carrying off the non-condensed vapors without admission of air.

In testimony whereof I have signed my name to this specification in the presence of two subscribing witnesses.

EDWARD SALOMON BERGLUND.

Witnesses:
 HUGO LINDAM,
 VERNER SVANTESON.

Copies of this patent may be obtained for five cents each, by addressing the "Commissioner of Patents Washington, D. C."